United States Patent [19]

Sawamura

[11] Patent Number: 5,332,866
[45] Date of Patent: Jul. 26, 1994

[54] WIRE HARNESS PROTECTOR ASSEMBLY
[75] Inventor: Naohito Sawamura, Yokkaichi, Japan
[73] Assignee: Sumitomo Wiring Systems, Ltd., Yokkaichi, Japan
[21] Appl. No.: 990,461
[22] Filed: Dec. 15, 1992
[30] Foreign Application Priority Data Dec. 20, 1991 [JP] Japan .............. 3-105532[U]

[51] Int. Cl.⁵ .............................. H02G 3/04
[52] U.S. Cl. .................. 174/101; 174/68.3; 174/48; 138/166
[58] Field of Search ............ 174/101, 48, 49, 68.1, 174/68.2, 68.3, 71 R, 72 A, 72 C, 92; 138/166; 220/339; 248/51, 52, 49; 59/78, 78.1

[56] References Cited

U.S. PATENT DOCUMENTS

| 4,891,471 | 1/1990 | Ono et al. ............. 174/101 X |
| 4,951,716 | 8/1990 | Tsunoda et al. ........ 174/101 X |

FOREIGN PATENT DOCUMENTS

| 0156651 | 10/1953 | Australia .............. 174/101 |
| 259725 | 3/1988 | European Pat. Off. . |
| 2014393 | 10/1971 | Fed. Rep. of Germany . |
| 0015213 | 1/1991 | Japan .................. 174/101 |
| 2067851 | 7/1981 | United Kingdom . |
| 2106214 | 4/1983 | United Kingdom . |

Primary Examiner—Leo P. Picard
Assistant Examiner—Hyung S. Sough
Attorney, Agent, or Firm—Sandler, Greenblum & Bernstein

[57] ABSTRACT

A harness protector assembly can accommodate a desired length of a wire harness to protect it. The harness protector assembly is assembled by two or more protectors and a connector or connectors. Each of the protectors has a bottom plate and a pair of opposed side walls extending upwards from respective sides of the bottom plate, and a projection is formed on an outer surface of each side wall in the proximity of one end thereof. The connector has an upper plate and two pairs of opposed tabs extending downwards from the upper plate. A through-hole is formed in each tab for engagement with the projection formed on each side wall of each protector. The connector also has a thin-wall portion substantially at the center thereof so as to be susceptible to bending. The harness protector assembly can be bent about the thin-wall portion of the connector at a desired angle.

5 Claims, 2 Drawing Sheets

WIRE HARNESS PROTECTOR ASSEMBLY

BACKGROUND OF THE INVENTION

1. Field of the Invention

The present invention relates to a protector assembly for accommodating and protecting a desired length of a wire harness to be laid on an intended path in an automotive body structure. The protector assembly is intended to prevent damage of the wire harness in the presence of other various components or members.

2. Description of the Prior Art

FIG. 6 depicts a wire harness 2 accommodated in a conventional harness protector assembly. The harness protector assembly comprises a plurality of harness protectors 1 made of resin or the like, each of which takes the form of a channel with its open end directed upwards. The harness protector assembly is secured to an automotive body structure by means of clips or any other suitable means.

The length or configuration of the harness protector assembly generally depends upon the location thereof. Molding a large-sized harness protector or a three-dimensional harness protector brings about an increase of the manufacturing cost of the harness protector assembly. Furthermore, such a harness protector requires a relatively large area for the storage thereof.

To solve these problems, the length or configuration of the harness protector assembly is often changed by connecting a plurality of harness protectors having a limited length either straight or at a given angle. In this case, one end of one harness protector 1 is in abutment with that of another harness protector 1, as shown in FIG. 6, and these ends are generally connected by winding a tape therearound over a desired length W.

However, when an external force is applied to the connecting portion during transportation of the wire harness together with the harness protector assembly, the problem arises that the mutually connected ends of the two harness protectors 1 may be separated from each other. Moreover, when the wire harness is laid on an automotive body structure, a tension is occasionally concentrated on the connecting portion around which the tape is wound. As a result, the problem arises that one of the harness protectors is forced to deviate from the other.

In the case of the tape winding, a three-dimensional harness protector assembly cannot be easily made by connecting two or more harness protectors at a desired angle. Even if the three-dimensional harness protector assembly is made by bending the connecting portion around which the tape is wound, it is likely that the angle of bending is changed upon application of an external force during storage or transportation of the harness protector assembly.

Because the connection by the tape winding includes several problems, a relatively long harness protector or a three-dimensional harness protector is integrally molded by the use of a large-sized molding die, thus causing an increase in manufacturing cost and requiring a large space for the storage thereof.

FIG. 7 depicts another conventional harness protector 1', which is provided with a hinge 1a' formed at an intermediate portion in a direction longitudinally thereof. The harness protector 1' can be bent about the hinge 1a', as shown by (B) of FIG. 7, so as to be used as a three-dimensional harness protector.

The use of this kind of harness protector is particularly effective in making the three-dimensional harness protector from a two-dimensional harness protector. Accordingly, no molding die is required to manufacture the three-dimensional harness protector.

In this case, although the harness protector shown by (B) can cover a bent path having a horizontal length of L1, when a substantially straight wire harness is desired to be protected over a length of L1 by the harness protector of (A), a length of L2 remains in excess. A large-sized molding die inevitably requires a large-sized equipment and causes an increase in manufacturing cost of the harness protector.

SUMMARY OF THE INVENTION

The present invention has been developed to overcome the above-described disadvantages.

It is accordingly an object of the present invention to provide an improved harness protector assembly capable of protecting a desired length of a wire harness even if the wire harness is straight or is desired to be bent. The harness protector assembly according to the present invention can be easily assembled by connecting two or more two-dimensional or substantially straight harness protectors each having a limited length.

In accomplishing the above and other objects, a harness protector assembly according to the present invention comprises at least two protectors each having engaging means in the proximity of one end thereof and at least one connector having retaining means for retaining therein the engaging means for connection of the two protectors. The connector also has a hinge means formed intermediately thereof so that the harness protector assembly can be bent about the hinge means at a given angle.

Each of the two protectors has a bottom plate and a pair of opposed side walls extending upwards from respective sides of the bottom plate, whereas the connector has an upper plate to be overlaid on the opposed side walls of each protector and has two pairs of opposed tabs extending downwards from the upper plate. Preferably, the engaging means of each protector comprises two projections, each of which is formed on an outer surface of each side wall, whereas the retaining means comprises a plurality of through-holes formed in respective tabs. It is also preferable that the hinge means comprises a thin-wall portion susceptible to bending.

Advantageously, a recess is formed on the outer surface of each side wall of one of the harness protectors, whereas a protruding portion extends from one end of each side wall of the other harness protector. In this case, a side wall of the recess and a free end of the protruding portion are both rounded so that the protruding portion is appropriately received by the recess, thereby allowing pivotal movement between the two harness protectors.

Alternatively, the connector has a bottom plate to be overlaid on the bottom plate of each protector and two pairs of opposed tabs extending upwards from the bottom plate.

According to the present invention, a relatively long two- or three-dimensional harness protector assembly can be made by connecting an appropriate number of harness protectors of a limited length. Furthermore, any complicated operation is not required to engage the engaging means of each harness protector with the retaining means of the connector, and no looseness occurs in the engagement between the engaging means and the retaining means. Even if a certain wire harness is desired to be protected by a three-dimensional harness protector assembly, the harness protector assembly is not required to take the form of a three-dimensional configuration prior to installation thereof. Accordingly, no large area is required for the storage of the harness protector assembly.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

The terms "two-dimensional" and "three-dimensional" as employed throughout this application are defined as "substantially straight" and "bent at a certain position", respectively.

Figure 1:
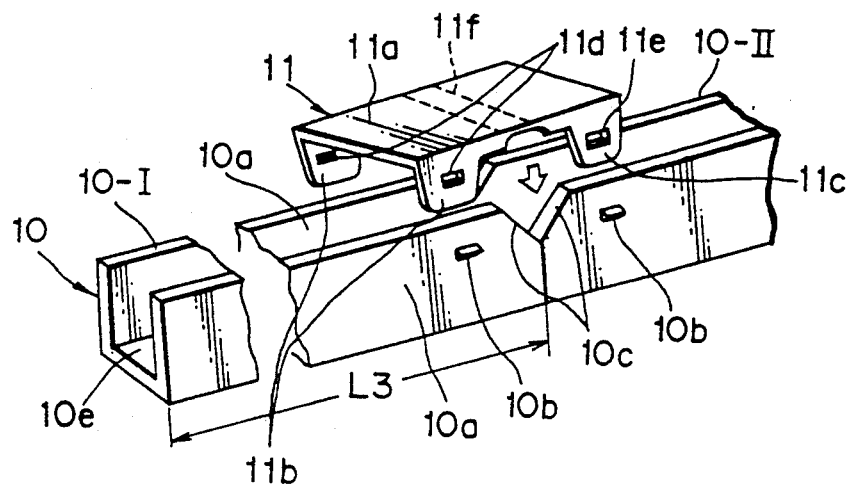
FIG. 1 is an exploded perspective view of a harness protector assembly according to a first embodiment of the present invention.
Figure 2:
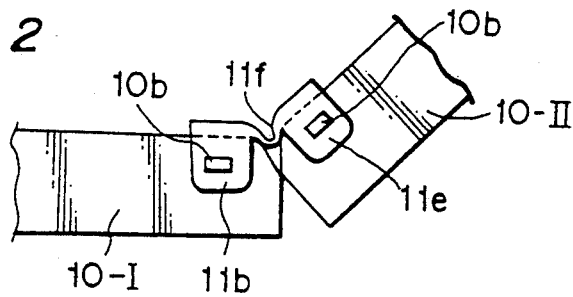
FIG. 2 is an elevational view of the harness protector assembly of FIG. 1 with a connector bent.

Referring now to the drawings, there is shown in FIGS. 1 and 2 a wire harness protector assembly 10 according to a first embodiment of the present invention. The harness protector assembly 10 comprises a pair of harness protectors 10-I and 10-II each having a given length of L3 and a connector 11 for connecting the two harness protectors 10-I and 10-II together. Each of the harness protectors 10-I and 10-II is integrally formed of resin and is of a channel structure with its open end directed upwards. The harness protector 10-I or 10-II has a bottom plate 10e and a pair of opposed side walls 10a extending upwards from respective sides of the bottom plate 10e. A projection 10b is formed on an outer surface of each of the side walls 10a. An upper corner of each side wall 10a of the harness protector 10-I or 10-II is obliquely cut out (this portion is hereinafter referred to as a cutout 10c), and each projection 10b is positioned in the proximity of the cutout 10c.

Because the harness protector assembly shown in FIG. 1 is comprised of two harness protectors 10-I and 10-II, the projections 10b and the cutouts 10c are formed at one end of each harness protector 10-I or 10-II. It is, however, to be noted that where one harness protector is intended to be joined at opposite ends thereof to two harness protectors, the projections 10b and the cutouts 10c are formed at both ends of said one harness protector.

The connector 11 is integrally formed of resin, as is the case with the harness protector 10-I or 10-II, and comprises an upper plate 11a to be overlaid on the opposed side walls 10a of the harness protectors 10-I and 10-II and two pairs of opposed tabs 11b and 11c extending downwards from both sides of the upper plate 11a. The tabs 11b and 11c have respective through-holes 11d and 11e to retain therein associated projections 10b formed on the two harness protectors 10-I and 10-II.

The upper plate 11a of the connector 11 has a thin-wall portion 11f of a given width extending generally perpendicular to the tab surface substantially at the center of the upper plate 11a. The thin-wall portion 11f provides the connector 11 with flexibility and serves as a hinge when the connectors 11 is required to be bent.

When a substantial length of a wire harness is desired to be protected, the two harness protectors 10-I and 10-II are placed adjacent to each other so as to accommodate the substantial length of the wire harness and are mutually connected by the connector 11, as shown in FIG. 1. In this case, a length of L3×2 of the wire harness is protected by the two harness protectors 10-I and 10-II connected by the connector 11. In applications where the two harness protectors 10-I and 10-II are lined up on a straight line, an end face of one of them is in contact with that of the other without any gap therebetween.

As occasion demands, the harness protector assembly shown in FIG. 1 can be bent with the thin-wall portion 11f of the connector 11 as a fulcrum, as shown in FIG. 2. In this case, although lower portions of opposed ends of the harness protectors 10-I and 10-II are spaced from each other to some extent, there arises no problem in protecting the wire harness.

Figure 3:
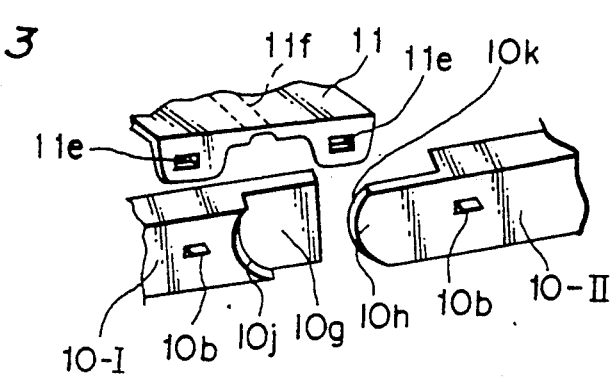
FIG. 3 is a view similar to FIG. 1, but according to a second embodiment of the present invention.

FIG. 3 depicts a harness protector assembly according to a second embodiment of the present invention, wherein a recess 10g is formed on an outer surface of one end of each side wall 10a of the harness protector 10-I, whereas a protruding portion 10h extends from one end of each side wall 10a of the harness protector 10-II. A side wall 10j of the recess 10g and a free end 10k of the protruding portion 10h are both rounded so that the protruding portion 10h may be appropriately received by the recess 10g, thereby allowing pivotal movement between the two harness protectors 10-I and 10-II. The connector 11 shown in FIG. 1 is also applicable to the harness protector assembly shown in FIG. 3.

In applications where the two harness protectors 10-I and 10-II are connected by the connector 11 and are bent about the thin-wall portion 11f of the connector 11 at a given angle, the free end 10k of the harness protector 10-II slides along the side wall 10j of the recess 10g of the harness protector 10-I. As a result, no gap is generated between the two harness protectors 10-I and 10-II even after the bending.

Figure 4:
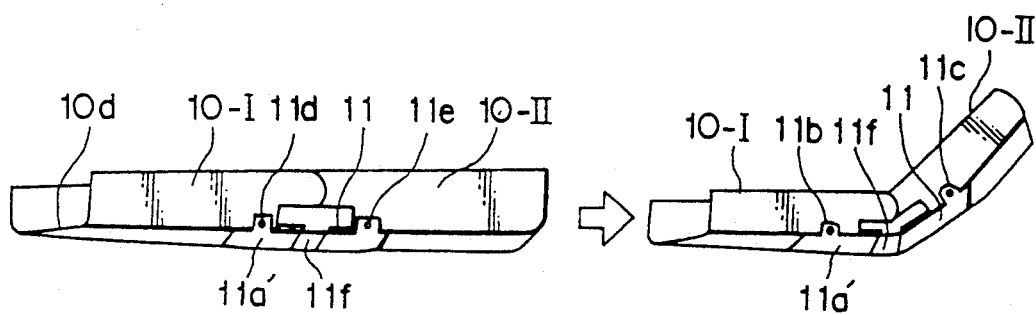
FIG. 4 is a perspective view of a harness protector assembly according to a third embodiment of the present invention.

FIG. 4 depicts a harness protector assembly according to a third embodiment of the present invention, wherein a connector 11 comprises a lower plate 11a' and two pairs of opposed tabs 11b and 11c extending upwards from both sides of the lower plate 11a'. The tabs 11b and 11c have respective through-holes 11d and 11e for retaining therein associated projections 10b formed on the outer surfaces of the side walls 10a of the harness protectors 10-I and 10-II. When the two harness protectors 10-I and 10-II are connected by the connector 11, the lower plate 11a' of the connector 11 is overlaid on the outer surface of bottom plates 10d of the harness protectors 10-I and 10-II. Thereafter, the projections 10b of the harness protectors 10-I and 10-II are inserted into the associated through-holes 11d and 11e for engagement therewith.

Because other construction and operation are the same as those of the first or second embodiment, explanation thereof is omitted for brevity's sake.

Figure 5A:
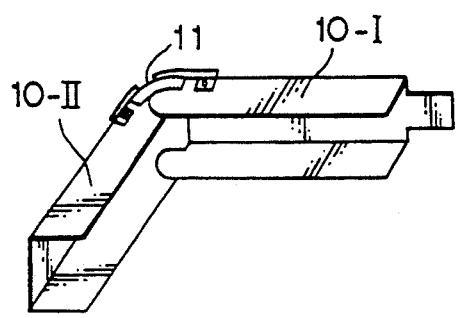
FIG. 5a is a perspective view of the wire harness protector assembly of FIG. 4 designed to be mounted in an automotive vehicle wherein a handle is positioned on the left-hand side of a passenger compartment.
Figure 5B:
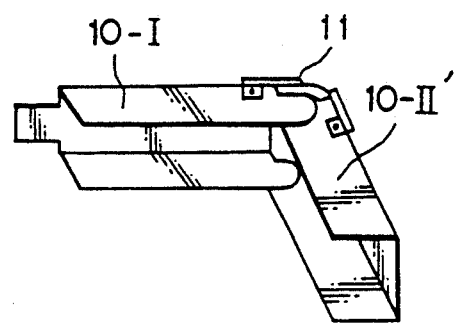
FIG. 5b is a view similar to FIG. 5a, indicating the wire harness protector assembly of FIG. 4 designed to be mounted in another automotive vehicle wherein the handle is positioned on the right-hand side of the passenger compartment.
Figure 6:
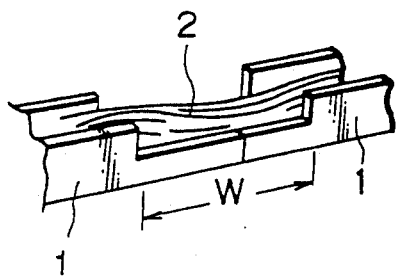
FIG. 6 is a fragmentary perspective view of a conventional wire harness protector assembly.
Figure 7:
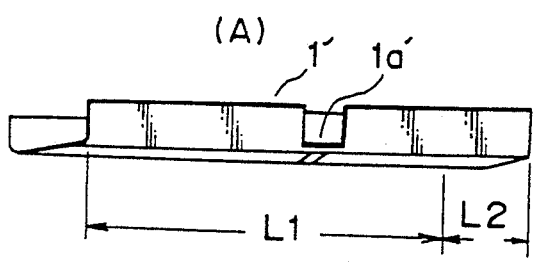
FIG. 7 is a perspective view of a conventional wire harness protector particularly indicating the case wherein the harness protector is bent at a given angle.
Figure 7:
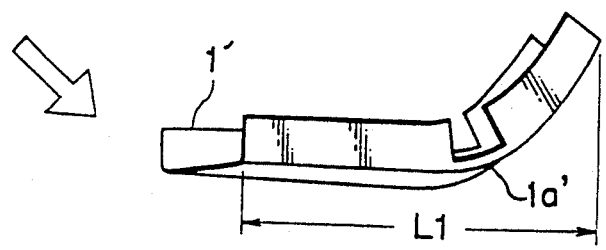

As discussed hereinabove, according to the present invention, because a three-dimensional harness protector assembly can be made by bending two mutually connected two-dimensional harness protectors at a desired angle, two symmetrical three-dimensional harness protector assemblies can be made using the same harness protectors 10-I, as shown in FIGS. 5a and 5b.

In general, the position of a driver's seat i.e., the position of a handle varies according to the type of automotive vehicle. Accordingly, a desired path of a wire harness changes according to the position of the handle. As a result, two types of symmetrical harness protector assemblies as shown in FIGS. 5a and 5b are required wherein limited types of harness protectors 10-I, 10-II, and 10-II' are used.

As is clear from the above, according to the present invention, because two or more wire harness protectors are connected either straight or at a desired angle by means of a connector or connectors provided with a hinge, each of the harness protectors can be made relatively short. For example, a conventionally used relatively long harness protector can be assembled by the use of two or three harness protectors according to the present invention. Accordingly, a molding die of the harness protector can be reduced in size, thus resulting in a reduction of the manufacturing cost.

Furthermore, because a three-dimensional harness protector assembly can be made by a combination of a plurality of two-dimensional harness protectors and a connector or connectors, a molding die is not required for the manufacture of such a three-dimensional harness protector. This also results in a reduction of the manufacturing cost.

In addition, because the harness protectors are connected by a connector or connectors substantially in a locked state, the harness protector assembly according to the present invention is advantageous in that no looseness occurs in the connection between the harness protectors during storage or transportation thereof.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A harness protector assembly for accommodating and protecting a desired length of a wire harness, said harness protector assembly comprising:

at least two protectors each having engaging means in the proximity of one end thereof;

at least one connector having retaining means for retaining therein said engaging means of said protectors for connection of said two protectors, said connector also having a hinge means formed intermediately thereof; and wherein each of said two protectors has a bottom plate and a pair of opposed side walls extending upwards from respective sides of said bottom plate, said engaging means of said each protector including two projections, each of which is formed on an outer surface of said each side wall, said connector having an upper plate to be overlaid on said opposed side walls at said one end of each protector and having two pairs of opposed tabs extending downwards from said upper plate, said retaining means including a plurality of receiving means formed in respective tabs, and said hinge means including a thin-wall portion susceptible to bending;

whereby said harness protector assembly can be bent about said hinge means at a given angle.

2. The harness protector assembly according to claim 1, wherein a recess is formed on the outer surface of said each side wall of one of said harness protectors, whereas a protruding portion extends from one end of said each side wall of the other harness protector, and wherein a side wall of said recess and a free end of said protruding portion are both rounded so that said protruding portion is appropriately received by said recess, thereby allowing pivotal movement between said two harness protectors.

3. The harness protector assembly according to claim 1, wherein said plurality of receiving means are through-holes.

4. A harness protector assembly for accommodating and protecting a desired length of a wire harness, said harness protector assembly comprising:

at least two protectors each having engaging means in the proximity of one end thereof;

at least one connector having retaining means for retaining therein said engaging means of said protectors for connection of said two protectors, said connector also having a hinge means formed intermediately thereof; and wherein each of said two protectors has a bottom plate and a pair of opposed side walls extending upwards from respective sides of said bottom plate, said engaging means of said each protector including two projections, each of which is formed on an outer surface of said each side wall, said connector having a bottom plate to be overlaid on said bottom plate of said each protector and two pairs of opposed table extending upwards from said bottom plate of said connector, said retaining means including a plurality of receiving means formed in respective tabs, and said hinge means including a thin-wall portion susceptible to bending;

whereby said harness protector assembly can be bent about said hinge means at a given angle.

5. The harness protector assembly according to claim 4, wherein said plurality of receiving means are through-holes.

* * * * *

UNITED STATES PATENT AND TRADEMARK OFFICE
CERTIFICATE OF CORRECTION

PATENT NO. : 5,332,866
DATED : July 26, 1994
INVENTOR(S) : Naohito SAWAMURA

It is certified that error appears in the above-indentified patent and that said Letters Patent is hereby corrected as shown below:

At column 6, line 55 (claim 4, line 19), change "table" to ---tabs---.

Signed and Sealed this

Fourteenth Day of March, 1995

Attest:

BRUCE LEHMAN

Attesting Officer

Commissioner of Patents and Trademarks